UNITED STATES PATENT OFFICE.

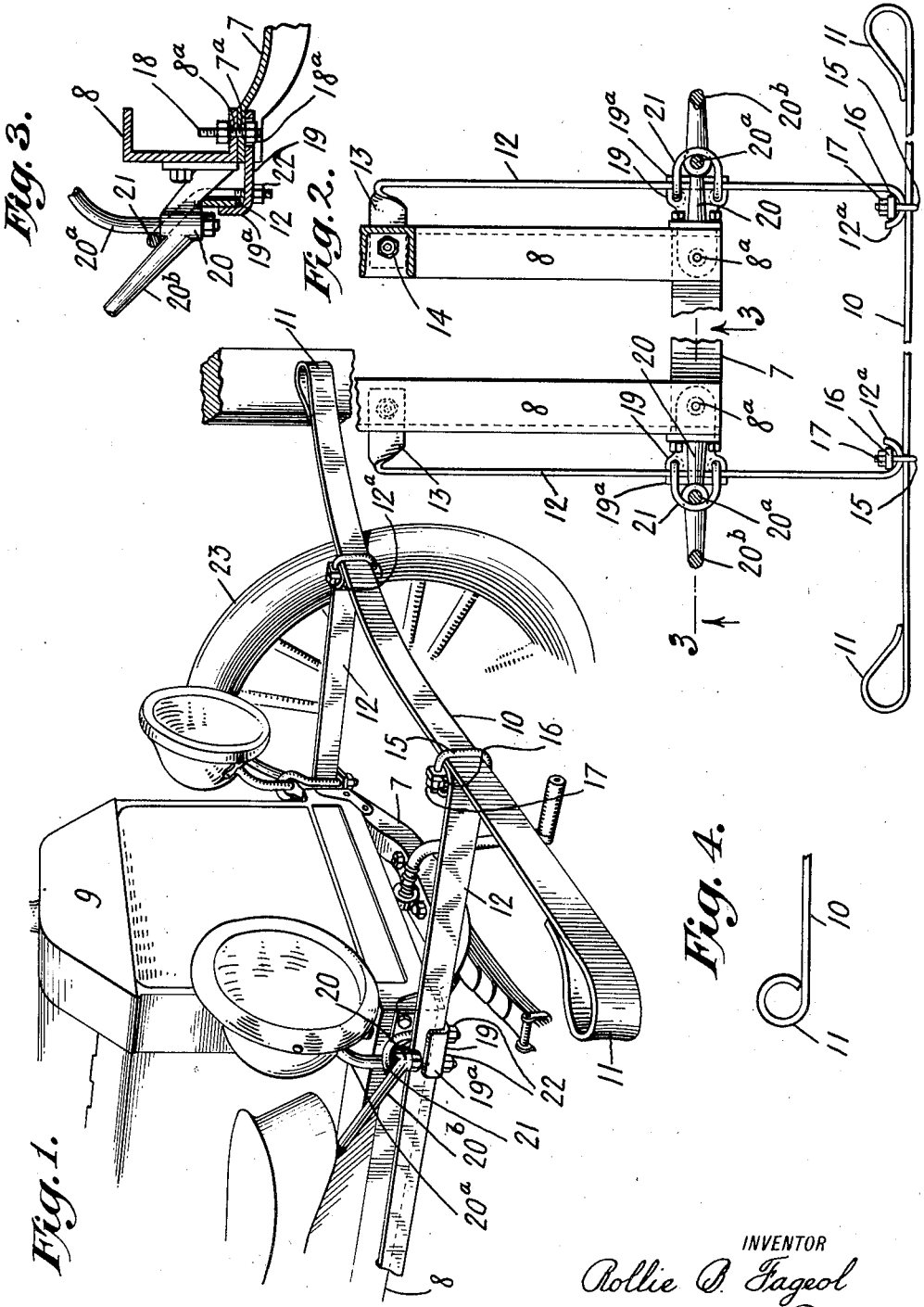

ROLLIE B. FAGEOL, OF OAKLAND, CALIFORNIA.

BUMPER FOR MOTOR-VEHICLES.

1,329,517.   Specification of Letters Patent.   Patented Feb. 3, 1920.

Application filed November 9, 1917. Serial No. 201,016.

*To all whom it may concern:*

Be it known that I, ROLLIE B. FAGEOL, a citizen of the United States, residing in Oakland, in the county of Alameda and State of California, have invented certain new and useful Improvements in Bumpers for Motor-Vehicles, of which the following is a specification.

The present invention relates generally to improvements in bumpers for the protection of motor vehicles against injury by collision with moving or stationary bodies, and is more especially directed to a bumper of that type wherein the so-called buffer bar or impact-receiving member is yieldable or resilient.

The primary object of the present invention is to provide a yieldable or resilient bumper for the purposes referred to which will comprise few parts, so that it may be economically manufactured and assembled and mounted on the vehicle with despatch.

A further object of my present invention is to provide a bumper having the aforesaid characteristics which while adaptable for motor vehicles of various types, is especially useful in conjunction with light-weight cars, wherein the channel bars or side members of the vehicle frame terminate substantially in the plane of the radiator of the vehicle.

My invention further comprehends a bumper, as aforesaid, having supporting arms or members formed of resilient material which may be so fastened or secured to the vehicle frame as to have the effect of continuations thereof, these arms being connected to the buffer bar or impact member in a manner to provide a wide range of adjustability, so as to permit the use of a single type of bumper on vehicles having different frame widths.

Another object of my invention is to provide a bumper of what is technically known as a "non-hook" type, which is so designed that the ends thereof will possess a degree of yieldability that will permit them to yield and ride over an obstructing surface without injury to the vehicle parts and without permanent distortion of the impact member as frequently happens in the various types of so-called spring bumpers now in use.

Other objects and advantages of my invention will become obvious as the description proceeds, and I would have it understood that I reserve unto myself the full range of equivalents, both in uses and structure, to which I may be entitled under my invention in its broadest aspect, the specific embodiment herein shown being merely selected for the purpose of affording a clear and comprehensive understanding of my invention, it being obvious from the following description that various modifications and changes may be made therein without departing from the spirit and scope of my invention.

I shall now proceed to describe my invention with reference to the drawings and then point out more particularly the novelty therein in the appended claims.

In the drawings

Figure 1 is a fragmentary perspective of the forward portion of a motor vehicle with my improved type of bumper applied thereto.

Fig. 2 is a top plan view partly in section, showing the manner in which my bumper is connected to the vehicle parts.

Fig. 3 is an enlarged detail partially in section on the line 3—3 of Fig. 2, showing the method of connecting my bumper to the lamp bracket of the vehicle; and Fig. 4 is a modification of the structure of the end of the bumper shown in Fig. 1.

Referring now to the drawings in detail in which like characters of reference are employed to designate similar parts throughout the several views, 7 represents the bolster or cross-frame member of the vehicle which is connected to and supported by the longitudinal frame members 8, these latter members terminating substantially in the vertical plane of the radiator 9.

The bumper comprises a buffer bar or impact member 10 which is made of spring metal, preferably steel of any proper gage and width, which is suitable to the purposes of my invention, the material being similar to that generally employed in the production of motor vehicle springs. The ends of this buffer bar or impact member are curved or turned back upon themselves to form the elongated loops indicated at 11. The supporting arms or attaching members 12 are formed of spring metal similar to that employed for the production of the buffer bar or impact member 10, and are adapted to lie in a plane parallel to the plane of the longitudinal frame members 8, as clearly shown in Fig. 2. The rear extremity of each of these supporting arms or attaching members 12 is bent at a right angle to the body portion of the member and is twisted or bent to the position shown at 13 in Fig. 2, so as to provide a flat surface to lie against the underside of the adjacent frame member 8, the two parts being rigidly secured together by a bolt 14 passing through apertures in the extremity 13 and the said frame member.

For connecting the supporting arms or attaching members to the buffer bar or impact member 10 I have found it expedient to impart a curvature to the ends of the supporting arms or attaching members, as indicated at 12$^a$, the inner surface of the buffer bar or impact member lying against the circumference of the curved portion 12$^a$ of the supporting arms or attaching members 12, and being locked in frictional engagement therewith by means of the U-bolt 15 carrying the cross-member 16 which is locked in engagement with the inner surface of the curved portion 12$^a$ by means of the securing nuts 17. If desired, the ends 12$^a$ of the supporting arms or attaching members 12 may be so formed as to provide a closed loop, as shown in Fig. 1, although I have found in actual practice that the structure illustrated in Fig. 2 serves to securely lock and hold the buffer bar in place upon the supporting arms.

In the particular type of vehicle illustrated, the forward transverse frame member 7 is apertured at 7$^a$ to register with a similar aperture 8$^a$ in the adjacent longitudinal frame member 8, the two parts being locked together by means of the bolt 18. I have found it expedient to utilize this bolt for supporting a bracket or plate 19 which is apertured to fit over the head of the bolt 18$^a$ and adapted to lie flat against the undersurface of the contiguous portion of the transverse frame member 7 and extends outwardly beyond the vertical plane of the side of the longitudinal frame member 8, as shown in Fig. 3, the outer end of the said plate or bracket being flanged or turned upwardly, as indicated at 19$^a$. It will be observed that the upper edge of the supporting arm or attaching member 12 abuts against the underside or surface of the lamp bracket and fender support 20 of the vehicle when the parts are mounted in their relative positions, the said supporting arm or attaching member being held in place within the bracket 19, the flange 19$^a$ of which contacts with the face of the supporting arm or attaching member, so that the said supporting arm or attaching member is firmly held against lateral movement. Ordinarily, the positioning of the supporting arm or attaching member between the bracket 19 and the lamp bracket 20 would suffice to hold it comparatively rigid, but in order to reinforce the structure I produce a clamping effect by the employment of the U-bolt 21, the head of which is shaped to lie within the two portions 20$^a$ and 20$^b$ of the combination lamp bracket and fender support 20, as shown in Fig. 3, the free extremities of said U-bolt passing through apertures in the plate or bracket 19 and being threaded to receive the locking nuts 22. It is apparent that by shaping or conforming the U-bolt, as shown in Fig. 3, that a clamping pressure is simultaneously exerted against the supporting arm or attaching member 12 in a vertical and horizontal plane, so that the supporting arm or attaching member is rigidly held in position, and, in effect, becomes an integral part of the frame construction of the vehicle.

From the structure described, it is manifest that upon an impact or shock being delivered to the buffer bar or impact member 10 that it will yield thereto, the supporting arms or attaching members 12 also yielding and the whole structure coöperating to dissipate the effect of the blow or shock so that it will not be transmitted to the vehicle parts. If, for instance, the vehicle is backing out of a garage and the extremity of the buffer bar or impact member 10 contacts with a post or any other obstruction, as frequently happens, and which usually results in permanent injury or damage to those forms of spring bumpers now in use, it will yield, as shown in Fig. 1, and ride over the surface of the obstruction and return to its normal position, without injury to the obstructing element or to any portion of the vehicle or to the bumper itself. The same is true if the vehicle is moving in a forward direction, the extremity of the buffer bar or impact member 10 yielding rearwardly and the elongated looped end 11 thereof cushioning against the vehicle tire 23.

The mounting of the supporting arms or attaching members 12 in the manner described, affords a simple means of attachment which does not necessitate the alteration of the vehicle or any parts thereof in any manner whatsoever and provides an absolutely rigid and firm connection between the vehicle frame and the bumper, whereby the stress of any impact which may be transmitted to the frame will be dissipated in a direction longitudinally thereof.

By the method of connecting the supporting arms or attaching members 12 to the buffer bar or impact member 10, the producer of my invention is not put to the necessity of manufacturing a large number of bumpers for use in connection with vehicles of different frame dimensions, as the facility with which the supporting arms or attaching members may be adjusted relatively to each other and to the buffer bar or impact member 10 permits of the use of one type of bumper for any width of frame.

The buffer bar or impact member 10 possesses enough strength within itself to amply protect the vehicle against injury if the shock or impact is delivered to said buffer bar intermediate of the attaching arms, but it is manifest that as the buffer bar yields inwardly or toward the front of the vehicle, that the tension thereof opposed to the shock will be reinforced or supplemented by the tension of the supporting members or attaching arms which will yield toward each other. Thus, by the use of my invention, which embodies a single piece of material forming the buffer bar, I am enabled to obtain substantially the same result as obtained from those types of spring bumpers now in use which have their buffer bars formed of a plurality of overlapping leaves or sections.

Many other objects and advantages of my construction over the prior devices in the art to which it appertains will present themselves, all of which are within the spirit and scope of my present invention.

Having thus described my invention what I claim as new and desire to secure by Letters Patent of the United States, is:

1. A bumper for motor vehicles having a yieldable buffer bar formed from a single piece of flat material extending transversely of the front of the vehicle, the extremities of said bar being looped, means for supporting said bar from said vehicle, said means being formed of flat yieldable material connected to the vehicle frame and constituting a forward continuation thereof, and means for connecting said bar to said supporting means, whereby the portions of said bar from the point of connection with said supporting means to the extremity of said bar will be capable of a movement to the limit of their inherent resiliency in opposite directions in a horizontal plane.

2. A bumper for motor vehicles having a buffer bar formed of a single piece of flat spring metal extending transversely of the front of the vehicle, the extremities of said bar being looped, arms for supporting said bar from said vehicle, said arms being formed of flat spring metal connected to the vehicle frame and constituting a continuation thereof, the outer ends of said arms being formed with loops, and means passing through said loops and embracing the contiguous parts of said bar to connect said bar to said arms, the loops providing bearing surfaces for the bar to ride upon when distorted under the force of an impact delivered thereto.

3. In combination with a motor vehicle, a bumper comprising a buffer bar formed from a single piece of flat spring material, supporting arms for said bar formed of flat spring material, said arms being adapted to project outwardly from said vehicle and forming continuations of the frame members thereof, means for rigidly securing each of said arms to the adjacent frame member of the vehicle, means for connecting each of said arms to a part of the vehicle supported by the frame thereof and extending outwardly therefrom, means for detachably connecting said buffer bar to the normally free extremities of said supporting arms, said latter means comprising loops formed on the free end of each of said supporting arms, and a member adapted to pass through each of said loops and embrace the contiguous portion of the buffer bar.

4. A bumper for motor vehicles having a buffer bar formed of a single piece of flat spring metal, supporting arms therefor, said supporting arms being formed of flat spring metal rigidly connected to the vehicle, and means for detachably connecting the ends of said supporting arms to said buffer-bar at points removed from the ends of said bar, whereby said buffer bar and said supporting arms may yield to the limit of their inherent resiliency in a plurality of directions in a horizontal plane under the force of an impact delivered to said buffer bar.

5. A bumper for motor vehicles having a buffer bar formed of a single piece of flat spring metal extending transversely of the vehicle, the extremities of said bar being looped, arms for supporting said bar from said vehicle, said arms being connected to the vehicle frame, the outer ends of said arms being formed with loops, and means passing through said loops and embracing the contiguous parts of said bar to connect said bar to said arms, the loops providing bearing surfaces for the bar to ride upon when distorted under the force of an impact delivered thereto.

6. A bumper for motor vehicles comprising a buffer-bar made of a single strip of flat spring material, the extremities of said bar being looped, a pair of members for supporting said bar forwardly of the vehicle, each of said members being formed at its outer end with a bearing surface for the bar, and means for connecting said outer ends of said pair of supporting members to the buffer-bar at points within the length of said bar and at points removed from said loops to provide free looped end portions at the opposite ends of said buffer-bar capable of movement to the limit of their inherent resiliency in opposite directions in a horizontal plane.

7. A bumper for motor vehicles comprising a buffer-bar made of a single strip of flat spring material, the extremities of said bar having rounded ends, a pair of members extending outwardly from the vehicle for supporting the bar transversely of and in spaced relation to the end of the vehicle, each of said members being provided at its outer end with a bearing surface for said bar, and means associated with each of said members and with said bar for detachably securing the buffer-bar thereto and within its length at points inwardly of the rounded ends of said bar, providing flexible rounded end portions at the opposite ends of said buffer-bar capable of fulcruming movement on the bearing ends of said supporting members to the limit of the inherent resiliency of said bar in opposite directions in a horizontal plane.

ROLLIE B. FAGEOL.